US012724002B2

(12) United States Patent
Beyenal et al.

(10) Patent No.: US 12,724,002 B2
(45) Date of Patent: Sep. 1, 2026

(54) ELECTROCHEMICAL SOIL REACTOR

(71) Applicant: WASHINGTON STATE UNIVERSITY, Pullman, WA (US)

(72) Inventors: Haluk Beyenal, Pullman, WA (US); Abdelrhman Mohamed, Chicago, IL (US); Maren Friesen, Pullman, WA (US)

(73) Assignee: Washington State University, Pullman, WA (US)

( * ) Notice: Subject to any disclaimer, the term of this patent is extended or adjusted under 35 U.S.C. 154(b) by 367 days.

(21) Appl. No.: 18/454,463

(22) Filed: Aug. 23, 2023

(65) Prior Publication Data

US 2024/0068982 A1 Feb. 29, 2024

Related U.S. Application Data

(60) Provisional application No. 63/400,529, filed on Aug. 24, 2022.

(51) Int. Cl.
*G01N 27/327* (2006.01)
*G01N 27/30* (2006.01)

(52) U.S. Cl.
CPC ....... *G01N 27/3277* (2013.01); *G01N 27/308* (2013.01)

(58) Field of Classification Search
CPC .. G01N 27/3277; G01N 27/308; G01N 33/24; G01N 33/243
See application file for complete search history.

(56) References Cited

U.S. PATENT DOCUMENTS

2009/0198117 A1* 8/2009 Cooper ................ A61B 5/6846 600/347
2019/0107509 A1* 4/2019 Burge ...................... A01G 7/00
2021/0010993 A1* 1/2021 Shibata .................. G01N 33/24
2022/0308036 A1* 9/2022 Liu ........................ G01N 33/24

FOREIGN PATENT DOCUMENTS

CN 113030441 B * 12/2023 ............. G01N 33/24
WO WO-2021245202 A1 * 12/2021 ......... G01N 27/3335

OTHER PUBLICATIONS

JP-2007192604-A machine transation (Year: 2007).*

* cited by examiner

*Primary Examiner* — C. Sun
(74) *Attorney, Agent, or Firm* — WCF IP

(57) ABSTRACT

A bioelectrochemical soil assessment method and system is disclosed, wherein electrical measurements provide distinct differences between healthy and unhealthy soils, and wherein the presence of microbes coupled to an electrode also indicates healthy soil but not for unhealthy soil. Moreover, a soil amendment solution addition stimulated current in both healthy and unhealthy soil, wherein the electrical current is utilized as a proxy for microbial metabolic activity to distinguish healthy and unhealthy soil.

12 Claims, 8 Drawing Sheets

ELECTROCHEMICAL SOIL REACTOR

GOVERNMENT INTERESTS

This invention was made with government support under grant numbers 1706889 and CBET0954186 awarded by National Science Foundation, and grant number 2019-67012-29667 awarded by United States Department of Agriculture-National Institute of Food & Agriculture. The government has certain rights in the invention.

FIELD OF THE INVENTION

The embodiments herein relate to bio-electrochemical systems. In particular, the embodiments herein relate to bio-electrochemical systems to monitor microbial activity so as to assess the behavior of similar soils that differ in their ability to support both plant growth and other ecosystem functions.

BACKGROUND OF THE INVENTION

Discussion of the Related Art

Soil health reflects the ability of soil to support both plant growth and other ecosystem functions. It is fundamentally an emergent property of the microbiomes that live below ground, fueled largely by resources exuded from plant roots. The soil and rhizosphere microbiome consist of millions of bacteria, fungi, and other organisms that play critical roles in nutrient mobilization and provisioning, defense against pathogens, and modulation of plant morphology and physiology. Soil health both influences and is influenced by microbial activity and the complex microbial interactions that occur in soil microbiomes.

Biofilms are a major part of the soil microbiome and are beneficial to microbial activity. Biofilms in soil are composed of multi-species microbial consortia attached to soil particles and other surfaces, including roots, fungal hyphae, and decomposing organic material. Research estimates that 40% to 80% of bacteria cells in soil reside in biofilms. The activity of soil biofilms controls the soil structure and physicochemical characteristics, influences water retention and flow, and controls the local chemical gradients in the soil including nutrients, oxygen, redox potential, and pH. Thus, biofilms drive all biogeochemical processes and represent the main way of bacterial and archaeal life. When bacteria grow as biofilms in soil, they generate extracellular polymeric substances which can be used to support their resilience, electron transfer and soil stability.

It is also to be appreciated that dissolved organic matter (DOM) represents one of the most mobile and reactive organic compounds. They are redox-active and can have electron transfer capability in soil and are observed for electrochemical and redox properties in soil. The microbes growing in soil use electron donors and acceptors in soluble or mineral form for their metabolic reactions and growth. Knowing this, it would be beneficial to replace such electron donors and acceptors to support microbial growth using configurations that can track microbial metabolic activities in addition to the extracellular electron transfer ability of microbes growing in soil.

Background information on an electrochemical system, is described and claimed in U.S. Pat. No. 8,123,920B2 entitled, "Method and apparatus for assay of electrochemical properties," filed Mar. 5, 2009, to Iyengar et al, including the following, "The presence of a select analyte in the sample is evaluated in an electrochemical system using a conduction cell-type apparatus. A potential or current is generated between the two electrodes of the cell sufficient to bring about oxidation or reduction of the analyte or of a mediator in an analyte-detection redox system, thereby forming a chemical potential gradient of the analyte or mediator between the two electrodes . . . "

Background information on a bio-electrochemical system in soil utilizing a potentiostat, is described and claimed in China Patent No. CN111167848A entitled, "Biochar-coupled bio-electrochemical soil remediation system and method," filed Jan. 6, 2020, to Yong et al, including the following, " . . . the bio-electrochemical reactor comprises a reaction container for containing soil to be repaired, an electrode for inserting the soil to be repaired and an electrochemical workstation; the electrodes comprise a working electrode, an auxiliary electrode and a reference electrode, and the working electrode, the auxiliary electrode and the reference electrode are electrically connected with the electrochemical workstation . . . "

Background information on an electrochemical system for soil monitoring utilizing a potentiostat, is described in IEEE publication entitled "Heavy Metal-Ion Detection in Soil Using Anodic Stripping Voltammetry," published in 2020 International Conference for Emerging Technology (INCET) on Aug. 3, 2020, including the following, "a low-cost electrochemical system is designed for the detection of Heavy metals (HM's) in soil solution. The system consists of screen-printed electrode, a potentiostat and microcontroller. The three terminal of Screen printed electrode is working electrode (WE), reference electrode (RE) and a counter electrode (CE). A potentiostat is an electronic circuit that has been designed which applies suitable voltage for operation and analyze the signal coming from screen printed electrode. Based on peak current obtained at different reduction potential presence of these heavy metal ions is determined . . . "

Accordingly, a need exists for novel electrochemical methods and configurations to track microbial activity in the soil to monitor soil health through direct or indirect measurements of soil microbial activity. The embodiments herein address such a need by way of a bio-electrochemical soil reactor system and method(s) that track the electrochemical behavior of similar soils that can diagnose healthy and unhealthy soils based on their differing ability to support plant growth.

BRIEF SUMMARY OF THE INVENTION

In an aspect, the embodiments herein are directed to a soil health monitoring method, that includes: positioning a plurality of electrodes at below the surface of a soil; measuring an open circuit potential value of each of the plurality of electrodes so as to indicate an area of maximum microbial activity area in the soil; positioning a first electrode and a second electrode within the indicated area of maximum microbial activity area; and measuring an electrochemical behavior resulting from one or more signals received from the first and the second electrode to provide a health assessment of the soil.

Another aspect includes an electrochemical soil assessment system, that includes: a plurality of carbon cloth electrodes embedded in a soil; a controller and data acquisition system communicatively coupled to the plurality of carbon cloth electrodes to monitor an electrochemical behavior over time indicative of the soil health, wherein the monitored electrochemical behavior includes at least one of a plurality of chronoamperometric values and a plurality of cyclic voltammetry values.

Accordingly, carbon cloth electrodes installed in soil reactors, enabled redox variations wherein healthy soil showed deeper reducing conditions. Electrical current measurements showed distinct differences between healthy and unhealthy soils, and scanning electron microscopy (SEM) images showed the presence of microbes firmly attached to the electrode for healthy soil but not for unhealthy soil. Glucose addition stimulated current in both soil types and caused differences in cyclic voltammograms between the two soil types to converge. Thus, electrical current as a proxy for microbial metabolic activity has been demonstrated to distinguish healthy and unhealthy soil.

DETAILED DESCRIPTION OF THE DISCLOSURE

Figure 1A:
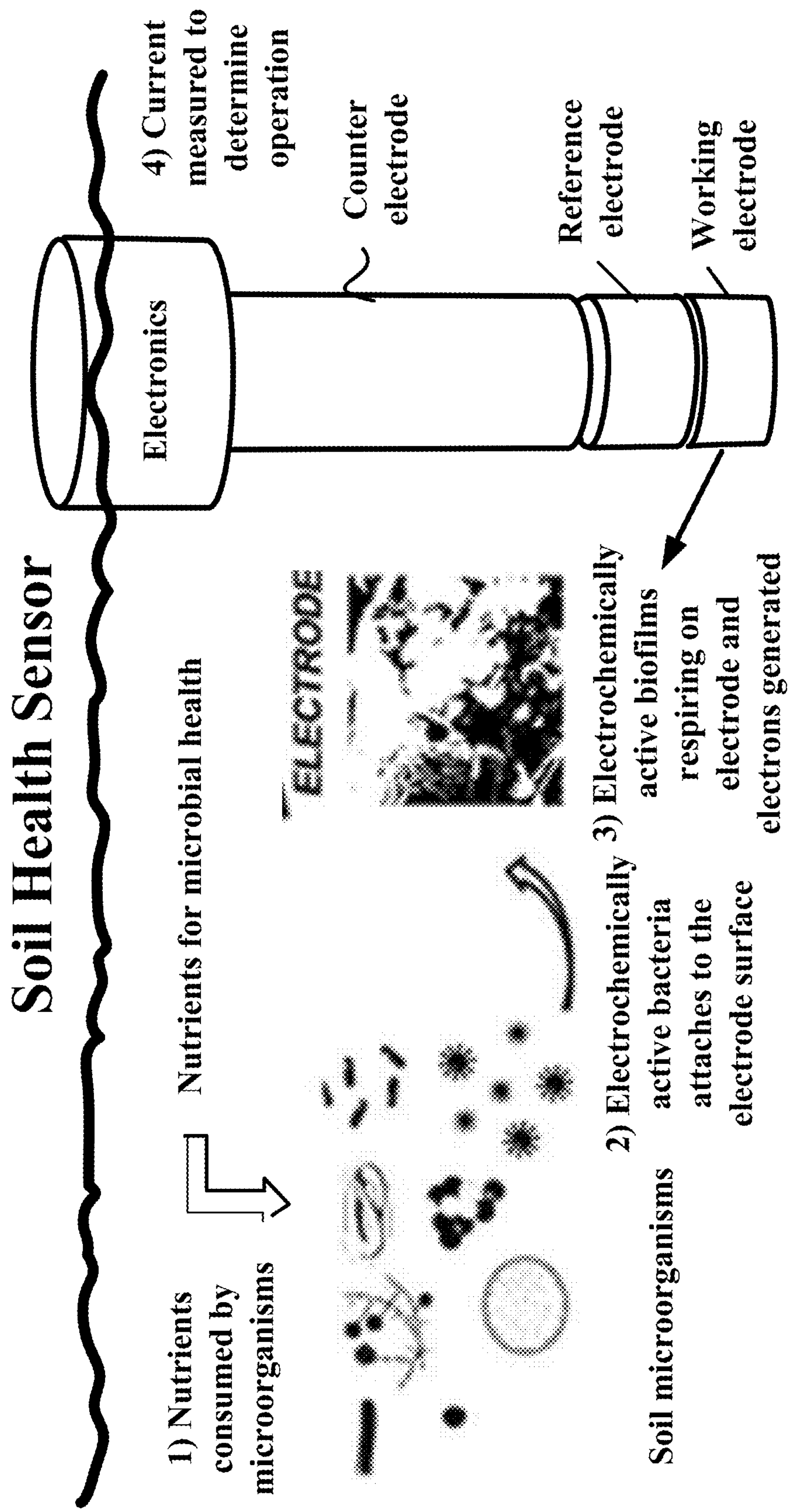
FIG. 1A shows an example schematic diagram of soil reactors used for open circuit potential experiments.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

Farmers need a real-time sensor to make faster decisions regarding crop yield; therefore, the soil health sensor disclosed herein provides farmers/customers with real-time microbial health data that offers quicker and more relatable information than the other commercially available and enable users to make decisions to improve the yield in days rather than waiting for the next planting season.

Microbes vary dramatically in their metabolic capabilities, and different metabolisms have varying properties in terms of (i) electrochemical potentials, (ii) electron transfer mechanisms and (iii) the electrical currents they generate. Thus, electron transfer in soil is monitored using electrodes to sense, for example, the electrochemical gradients that are generated by microbial metabolism.

The present embodiments are thus directed to a novel sensor/methodology for detecting microbial activities leading to a prediction of soil health. In particular, soils that differ in their ability to support plant growth can be referred to as healthy soil and unhealthy soil. Both such soils (i.e., healthy soil and unhealthy soil) are reflected based on electrochemical activities/signals due to growth of biofilms. To track such electrochemical activities, a bio-electrochemical soil reactor and methodologies, as presented herein, are thus utilized to interrogate a given soil area/volume so as to determine the overall health (i.e., healthy versus unhealthy) for plant growth and other ecosystem functional purposes. It is noted that electrochemical signals refers to a set of multidimensional extracellular electron transfer measurements that includes: 1) measured anodic or cathodic current when an electrode is polarized to a set potential, 2) cyclic voltammetry (CV) showing redox activity, 3) square wave voltammetry (SWV) showing the activity of redox mediators, 4) conductance showing e-transfer ability of soil, and 5) electrochemical impedance spectroscopy (EIS) elucidating e-transfer mechanisms from one location to another location in the soil.

It is to be appreciated that a beneficial aspect is that after initial analysis, soil reactor components are thereafter placed at an optimum position in a given soil area/volume for accurate monitoring of the health of the soil. As part of the initial analysis, experiments were carried out to determine an optimum depth within a soil area/volume, wherein, as an example only, chronoamperometry (CA) was utilized as an aid in providing information as to an optimum electrode(s) placement for measurements that allows soil health determination. The overall principle is that varying electrochemical signals are indicative of healthy and unhealthy soils from which generated 3D distributions (3D mapping of electrochemical conditions) are generated to indicate the existence of microbial gradients and microbial hotspots (small soil volumes with much higher process rates and interactions compared to the average of conditions) in soil. As an additional embodiment, in understanding the soil electrochemistry to make plants healthier, soil microbiomes can be engineered using electrochemistry and make electrochemically modulated plants (e-plant).

Specific Description

Soil Reactor System and Electrode Structures

Turning to the drawings, FIG. 1A shows a general graphical representation of a sensor's operation principle, as disclosed herein. The electrochemically active biofilm transfers electrons to the carbon fabric electrode, which acts as an electron acceptor. Once a reference and counter electrode are introduced to the system and the electronic device (potentiostat) is connected, it is possible to measure electrical current or perform electrochemical characterizations as exemplified in this proposal. Data showed that 1) electrochemical signals differ between healthy and less healthy soil and 2) sensor response to nutrient additions. Such a sensor provides information about soil health in real time and based on the real-time response, farmers can control soil health and improve plant yield.

Figures 1B, 1C:
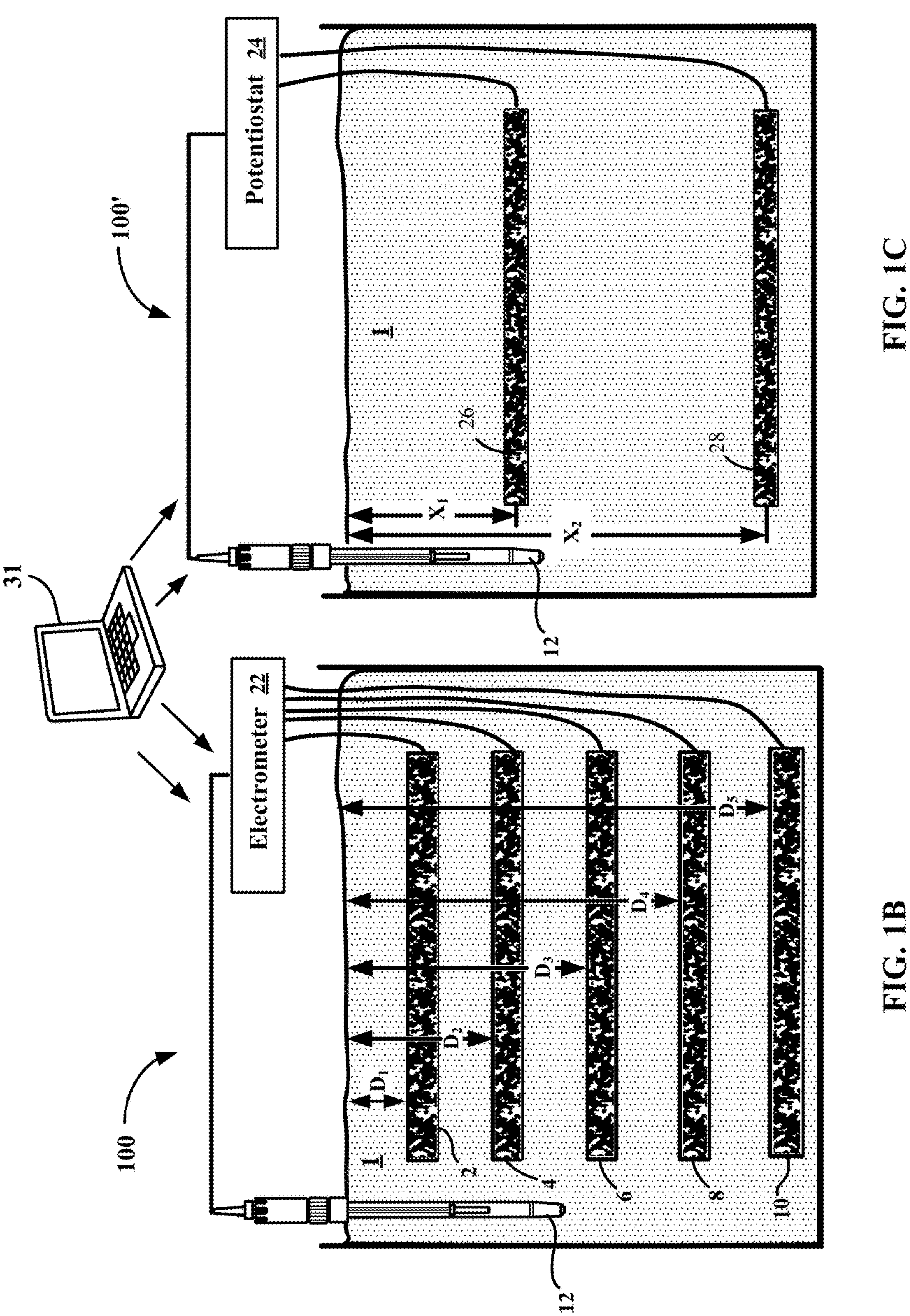
FIG. 1B shows an example schematic diagram of soil reactors used for open circuit potential experiments.
FIG. 1C shows another example schematic diagram of the soil reactors used for biofilm enrichment experiments.

FIG. 1B and FIG. 1C illustrate beneficial example soil reactors 100 and electrode structures utilized herein to provide for measurements, such as, open circuit potential (OCP) measurements and for biofilm enrichment interrogation. With respect particularly to open circuit potential (OCP) arrangements, such configurations are passive by design, in that the counter electrode (necessary to pass current through the cell) circuitry as part of a potentiostat 24 (see FIG. 1C) design, as utilized herein, is bypassed, and wherein only the resting potential measured between a reference and working electrode is measured.

It is to be noted that the soil reactors 100, 100' shown in FIG. 1B and FIG. 1C can be coupled to a controller/PC 31 to direct and interpret information (signals) to and from soil reactors 100, 100'. The controller/PC 31 and data acquisition system itself is to be noted of various circuitry of a known type. Such a control and data system can be implemented as any one of or a combination of general or special-purpose processors (digital signal processor (DSP)), firmware, software, graphical user interfaces (e.g., LabVIEW) and/or hardware circuitry to provide instrument control, desired electrical power, and data analysis, etc., for the example configurations disclosed herein. It is also to be appreciated that instructions to operate the soil reactors 100, 100' shown in FIG. 1B and FIG. 1C may be executed via for example the controller/PC 31, which includes hardware and software logic for providing instructions and control functions.

In addition, such instructions and control functions, as described above, can also be implemented to operate via a machine-readable medium (e.g., a computer readable medium). A computer-readable medium, in accordance with aspects of the present invention, refers to media known and understood by those of ordinary skill in the art, which have encoded information provided in a form that can be read (i.e., scanned/sensed) by a machine/computer and interpreted by the machine's/computer's hardware and/or software.

Charge-based soil health index relies on total electrons transferred to the electrode during the measurement time and can be defined for initial, short, or long term. We plan to calculate these two candidates SHI for our sensor across multiple soils and determine which shows the best correlation with long-term relative yield LTAR data. We expect that we will not have a problem defining SHI in the laboratory where we can control the environmental conditions. Recently, we have developed antibiotic susceptibility index (ASI) to categorize results from antibiotic-susceptibility and -resistant strains that works independently of bacterial species and type of antibiotic. 6° We will apply the same strategy for the proposed research. However, in the field, SHI can be controlled by environmental conditions. If this is the case, SHI calculated from charge transfer would most likely make more sense since it is averaged.

Turning back to the drawings, the soil reactor shown in FIG. 1B and referenced by the numeral 100, shows a means of initial soil analysis using a reference electrode 12 and a plurality of positioned electrodes, often identical electrodes (e.g., carbon fabric electrodes, as denoted by reference characters 2, 4, 6, 8 and 10) deployed at various given depths $D_1$, $D_2$, $D_3$, $D_4$ and $D_5$, (as also denoted with respective double arrowed designators) below a soil 1 surface, respectively. While other known in the art electrodes can be utilized, carbon fabric electrodes are beneficial for the present invention because they have a high surface area, are environmentally friendly, have a high mechanical integrity, can withstand high temperatures and very harsh chemical environments, and can be impregnated with various other metals (e.g., Aluminum, Titanium, etc.) or can be configured from carbon-coated Si nanowires grown in situ on highly conductive and flexible carbon fabric substrates, all of which is designed to aid in electrical properties.

Whichever types of electrodes selected, an example working arrangement had such electrodes positioned at 2 cm, 4 cm, 6 cm, 8 cm, and 10 cm, respectively. Also shown in FIG. 1A is an electrometer 22 (i.e., a highly sensitive electronic voltmeter) coupled to the carbon fabric electrodes 2, 4, 6, 8 and 10 in addition to a single reference electrode 12 (a reference electrode is used to measure the Working Electrode (Ref. Char. 28 in FIG. 1B) potential) configured often, but not necessarily, with a porous tip located at a desired depth below the soil surface (e.g., at about 6 cm).

Open Circuit Potential Experiments and Effect of Deployment Depths

As shown in FIG. 1B, the reference electrode 12 was inserted in the reactor 100 configuration such that the tip of the reference electrode 12 is located at a desired depth below the soil surface (e.g., 6 am in an example arrangement). OCP measurements are recorded for each electrode using, for example, a voltmeter. OCP measurements are thereafter recorded for a number of days, wherein in the arrangement herein, 18 days as a minimum was used and measurements continued until stable OCP values are established. As detailed herein, the deployment of the electrodes at the various given depths $D_1$, $D_2$, $D_3$, $D_4$ and $D_5$, as shown in FIG. 1B, was found to influence OCP values.

Figure 2:
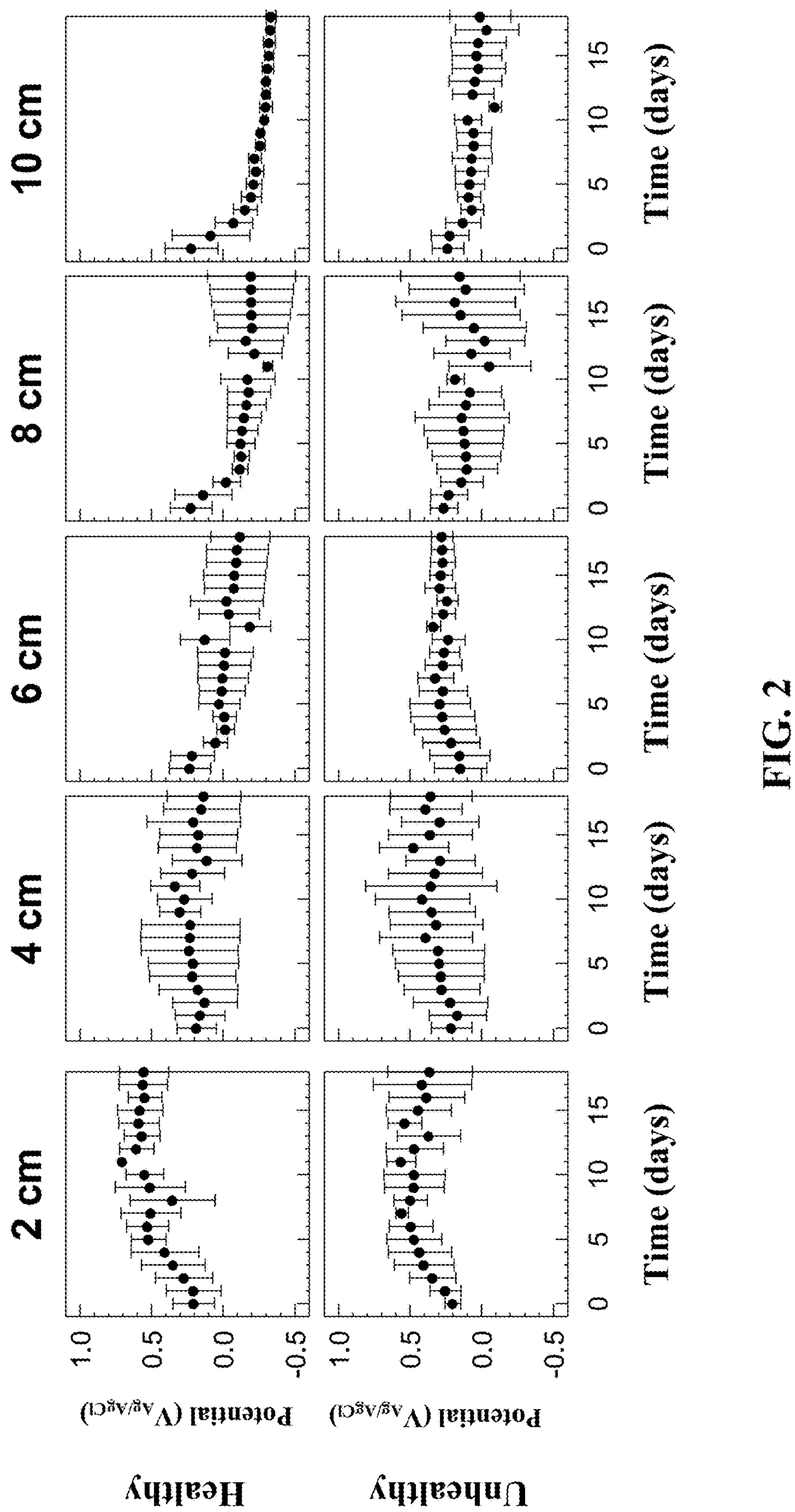
FIG. 2 shows dependency results of deployment depth on the open circuit potential of electrodes deployed in healthy and unhealthy soil reactors.

The resulting Open Circuit Potential (OCP) was determined by the redox activity on the surface of an electrode and allowed determination about whether the electrode is placed in an oxidizing or reducing environment. FIG. 2 shows the dependency of deployment depth on the open circuit potential of electrodes deployed in healthy and unhealthy soil reactors. Electrodes were deployed at 2 cm, 4 cm, 6 cm, 8 cm, and 10 cm below the soil surface. Data are represented as means and standard deviations of four biological replicates. Initially, electrodes deployed in all depths, as graphically shown in FIG. 1B so as to result in the data of FIG. 2, in healthy and unhealthy soils, showed a similar OCP range: 0.184 to 0.222 $V_{Ag/AgCl}$ and 0.143 to 0.261 $V_{Ag/AgCl}$ for healthy and unhealthy soils, respectively. Electrodes near the soil surface (e.g., depth=2 cm, $D_1$) gradually increased their OCP over time in healthy and unhealthy soil reactors. After, for example, a number of days (e.g., 18 days) the OCP reached, for example, 0.552±0.172 $V_{Ag/AgCl}$ and 0.360±0.296 $V_{Ag/AgCl}$ for healthy and unhealthy soil reactors, respectively. The increase in OCP value indicates that there is a predominantly oxidizing environment, due to the establishment of an anaerobic zone at the top of the soils.

The measured OCP values gradually decreased with increasing deployment depth in the healthy soil reactors (see FIG. 2). After the 18 days, OCP values reached values of 0.133±0.258 $V_{Ag/AgCl}$, −0.122±0.206 $V_{Ag/AgCl}$, −0.197±0.306 $V_{Ag/AgCl}$ and −0.335±0.033 $V_{Ag/AgCl}$ for electrodes deployed at 4 cm $D_2$, 6 cm $D_3$, 8 cm $D_4$, and 10 cm $D_5$ in the healthy soil reactors, respectively. It is notable that OCP variability between replicates decreased at the lowest depth (10 cm $D_5$), indicating that reducing conditions dominated the vicinity of the electrodes.

Low OCP values also indicates that microorganisms utilize an electrode surface as an electron sink if alternative electron acceptors are not readily available. Oxygen is consumed due to the microbial activity in the soil, causing a gradient of oxygen concentration with depth and the establishment of an anaerobic zone at the deeper parts of the soil. In comparison, a mild decrease in OCP is observed with decreasing deployment depth in the unhealthy soil reactors. The OCP values reached 0.353±0.286 $V_{Ag/AgCl}$, 0.275±0.075 $V_{Ag/AgCl}$, 0.149±0.417 $V_{Ag/AgCl}$ and 0.008±0.213 $V_{Ag/AgCl}$ for electrodes deployed at 4 cm, 6 cm, 8 cm, and 10 cm in the unhealthy soil reactors, respectively, after 18 days.

Accordingly, OCP measurements suggested a higher microbial activity in the healthy soil reactors, causing a larger decrease in measured OCP values which increased with depth. The data of the embodiments herein indicated that OCP depth gradients are capable of being used as a proxy for microbial activity in soils, and to differentiate between healthy and unhealthy soil sources. Because reducing environments are prevalent in the deeper parts of healthy soil reactors, such environments provide a more favorable conditions for the enrichment of anodic electrochemically active biofilms (EABs), which can utilize electrodes polarized at oxidizing potentials as an electron sink. Successful enrichment of anodic EABs could be used as an indicator for metabolic activity near in the vicinity of the electrode surface, which is a useful tool to infer soil health.

FIG. 1C shows a subsequent illustrative reactor 100' that incorporates a potentiostat 24 utilized for potentiostatic enrichment of electrochemically active biofilms (EABs). The soil reactor of FIG. 1C includes a reference electrode 12 and two identical electrodes (carbon fabric electrodes), i.e., a working electrode 28 and a counter electrode 26. Based on the results of the OCP experiment, the working electrode 28 and a counter electrode 26 were deployed in this working embodiment investigation, at about 8 cm and 6 cm below the soil surface, respectively and the reference electrode 12 was placed such that the porous frit was located at a depth often between the working and the counter electrodes 28 and 26, respectively.

The working and the counter electrodes 28 and 26 deployed in the soil reactor of FIG. 1B were polarized at about 0.3 $V_{Ag/AgCl}$ to target the enrichment of anodic biofilms on the working electrode 28. Chronoamperometric measurements were used to monitor the current resulting from biofilm enrichment. An in-house custom potentiostat was used to control the working electrode potential during enrichment and measure the resulting current. The aforementioned electrodes were continuously polarized until the current reached a pseudo-steady state (about 5% change over a day). After reaching a pseudo-steady state current, the soil reactors were amended with a carbon source (e.g., glucose solution) to test whether the activity of the biofilms enriched in healthy and unhealthy soils increases in response to the addition of organic carbon sources.

Accordingly, glucose was injected into the soil reactor in an adjacent area of the working electrode 28 using, for example, a long needle. A given depth can be determined using length marks made along the needle. In the example arrangement herein, 15 mL volume of 1.85 M glucose was injected; the equivalent of 5 g of glucose was added to each reactor. Chronoamperometric measurements were recorded for again a number of days (here for example, 25 days) to monitor the response to glucose amendment.

Electrochemical Methods

A potentiostat was used to record OCP and cyclic voltammetry measurements. The measurements were recorded at different time points to monitor biofilm enrichment on the electrochemical activity observed on the working electrode 28, as shown in FIG. 1B. OCP and cyclic voltammograms (a graph that can be drawn electrochemical measurements) were recorded at: 1) day 0—immediately after assembling the soil reactors, 2) day 8—after the initial biofilm enrichment and prior to the addition of glucose, and 3) day 25 and day 36—at two time points after soil amendment with glucose. Cyclic voltammograms were recorded from 0.6 $V_{Ag/AgCl}$ to −0.7 $V_{Ag/AgCl}$ and then back to 0.6 $V_{Ag/AgCl}$ at a scan rate of 0.01 V/s. Three cycles were recorded for each experimental condition. In general, the $2^{nd}$ and $3^{rd}$ cycles showed identical response, which is slightly different from the $1^{st}$ cycle due to the initial contribution of non-Faradaic currents. The $2^{nd}$ cycles are reported as representative voltammograms describing the behavior of the biofilm electrodes.

Scanning Electron Microscopy

Scanning electron microscopy (SEM) was used to provide information about the enrichment of EABs on polarized electrodes deployed at in this example arrangement, 8 cm depth, in healthy and unhealthy soil reactors. The electrodes were removed from the reactor and immersed overnight in 2% paraformaldehyde, 2% glutaraldehyde in 0.1 M phosphate buffer for primary fixation. The electrodes were then fixed using hexamethyldisilazane then placed in 2% osmium tetroxide at room temperature for 1 hour and dehydrated immediately. The dehydration process was done using ethanol solutions of 30%, 50%, 70%, 90%, and 100% (10 minutes per step). After the dehydration, the samples were allowed to dry and then coated with gold. The electrodes were then placed on aluminum stubs and analyzed by field emission scanning electron microscopy. Representative images are included for polarized electrodes deployed in healthy and unhealthy soil reactors.

Differential Response of Polarized Electrodes Deployed in Healthy and Unhealthy Soil Reactors The OCP data shown in FIG. 2 indicated that a reducing environment is dominant in depths below 6 cm. The reducing environment was more evident in healthy soil in comparison to unhealthy soil reactors, suggesting that a measured OCP can be influenced by microbial metabolism due to oxygen consumption in the top layers of the soil or due to extracellular electron transfer to the electrodes. The availability of microbes capable of extracellular electron transfer is thus capable of being capitalized on to provide a means of electrochemical sensing to measure soil health. The enrichment of anodic EABs on the surface of, for example, polarized electrodes allows monitoring the level of microbial metabolism as current. Since healthy soil can support the metabolism of soil microbes at a higher rate compared to unhealthy soils, a higher current is to be observed in electrodes deployed in healthy soil reactors.

Figures 3A, 3B:
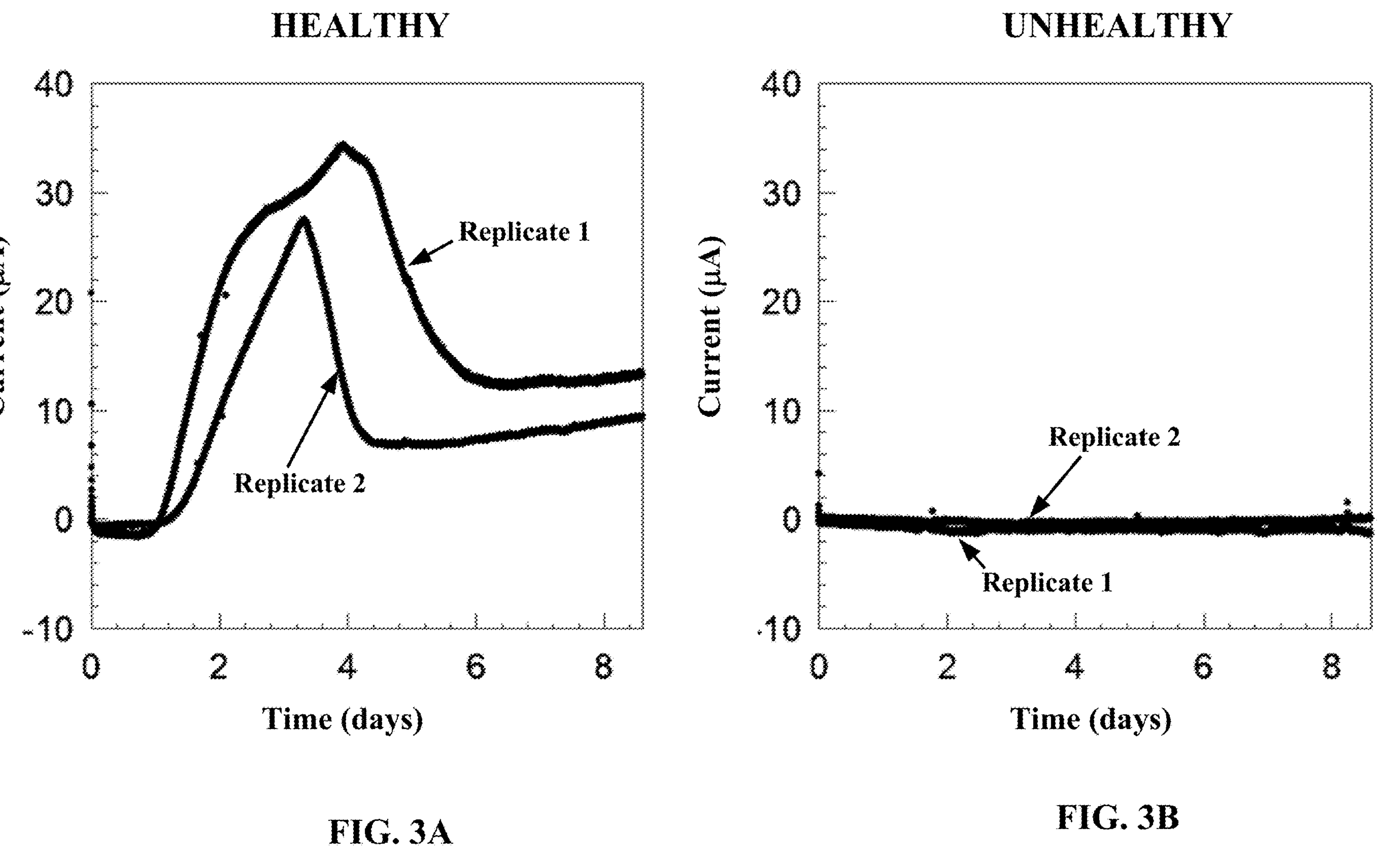
FIG. 3A shows chronoamperometric scans for electrodes deployed in healthy soil reactors.
FIG. 3B shows chronoamperometric scans for electrodes deployed in unhealthy soil reactors.

FIG. 13A and FIG. 3B illustrate chronoamperometric scans for electrodes deployed in healthy and unhealthy soil reactors, respectively. The electrodes as polarized to provide such scans, were deployed, for example, at about 8 cm below the soil surface and their potential was controlled at 0.3 VAg/AgCl. Thereafter, current measurements were used to distinguish healthy from unhealthy soils. In particular, anodic current was observed within the first day of polarization in healthy soil reactors and increased by 22.4 μA and 10.5 μA above baseline after 2 days in two biological replicates, as shown in FIG. 3A. Anodic current continued to increase, reaching a maximum of 34.4 μA (denoted as replicate 1) and 27.6 μA (denoted as replicate 2) after 3.9 days and 3.3 days of polarization, respectively. The measured current then decreased, reaching an average of 15.5 μA and 11.8 μA after 8 days. By comparison, no significant current change was observed in the electrodes deployed in unhealthy soil reactors (see FIG. 13B). Anodic current in unhealthy soil reactors changed by-1.0 μA and 0.0 μA after 8 days in 2 biological replicates.

Figures 4A, 4B, 4C, 4D:
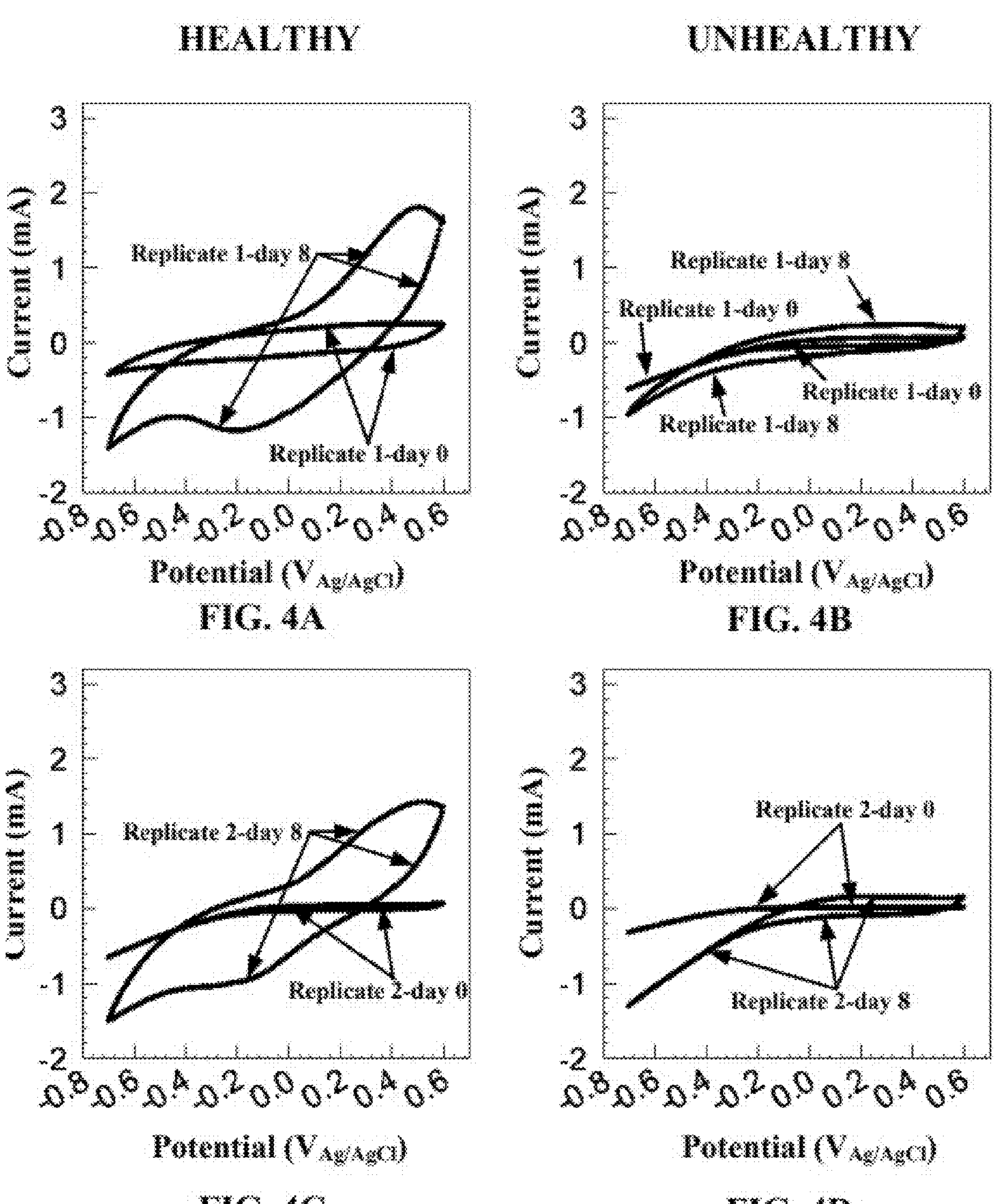
FIG. 4A shows a cyclic voltammogram for electrodes deployed in a healthy soil reactor.
FIG. 4B shows a cyclic voltammogram for electrodes deployed in an unhealthy soil reactor.
FIG. 4C shows another cyclic voltammogram for electrodes deployed in a healthy soil reactor.
FIG. 4D shows another cyclic voltammogram for electrodes deployed in an unhealthy soil reactor.

FIG. 4A and FIG. 4C show cyclic voltammograms for electrodes deployed in healthy soil reactors while FIG. 4B and FIG. 4D show cyclic voltammograms for electrodes deployed in unhealthy soil reactors. Cyclic voltammograms were recorded immediately after deployment (background) and after constant polarization for 8 days (after enrichment). Cyclic voltammograms indicated EAB biofilm enrichment on polarized electrodes, as disclosed herein, in the healthy soil reactors.

Accordingly, as illustrated in FIGS. 4A-4D, cyclic voltammetry was used to further investigate the electrochemical behavior on the polarized electrodes deployed in healthy and unhealthy soils. Cyclic voltammograms (CVs) were recorded at two end points: 1) background CVs recorded immediately after assembling the soil reactors and prior to electrode polarization (day 0), and 2) CVs after the enrichment of EABs recorded after constant polarization at 0.3 $V_{Ag/AgCl}$ for 8.6 days (day 8). Background CVs (day 0) showed similar behavior in electrodes deployed in healthy and unhealthy soil reactors. In both healthy and unhealthy systems, CVs consisted of a non-Faradaic background region and a cathodic wave below −0.2 $V_{Ag/AgCl}$. Changes observed in the non-Faradaic region—mainly change in electrode capacitance—is attributed to differences in the construction of the electrodes or changes in the soil structure in the vicinity of the electrode surface. The cathodic wave is likely due to abiotic oxygen reduction on the working electrode surface. The difference in the magnitude of the reduction wave may be attributed to the variability of local oxygen concentration near the electrode surface in each reactor. Regardless, background CVs showed that all electrodes in both healthy and unhealthy soil reactors exhibited similar electrochemical behavior at time zero, with no evidence of electrochemical reactions coupled to biological metabolism or presence of EABs.

The electrochemical behavior observed in CVs recorded after 8.6 days of constant polarization at 0.3VAg/AgCl provided evidence for the enrichment of anodic EABs in healthy soil. An anodic behavior is observed above 0.1 VAg/AgCl in both electrodes deployed in healthy soil, with an anodic peak centered at 0.5 VAg/AgCl (see FIG. 4 A and FIG. 4C). This anodic reaction is likely the source of anodic current observed in constant polarization experiments in FIG. 1A and indicate that enriched EABs utilize the polarized electrode as a terminal electron acceptor.

Similarly, CVs of healthy soil reactors show a cathodic behavior below 0.1 VAg/AgCl, with a cathodic peak observed at −0.17 VAg/AgCl. In comparison, electrodes deployed in the unhealthy soil reactors exhibited similar behavior to the background CVs characterized by a non-Faradaic background region and a cathodic wave below-0.2 VAg/AgCl (see FIG. 4 B and FIG. 4D). Both replicates showed an increase in the capacitive current in the background region, due to the adsorption of non-electrochemically active compounds from the soil onto the surface of the carbon electrode. Collectively, chronoamperometric scans and CVs show that anodic polarization selectively enhanced the electrochemical signals in electrodes deployed in healthy soil reactors.

Figure 5B:
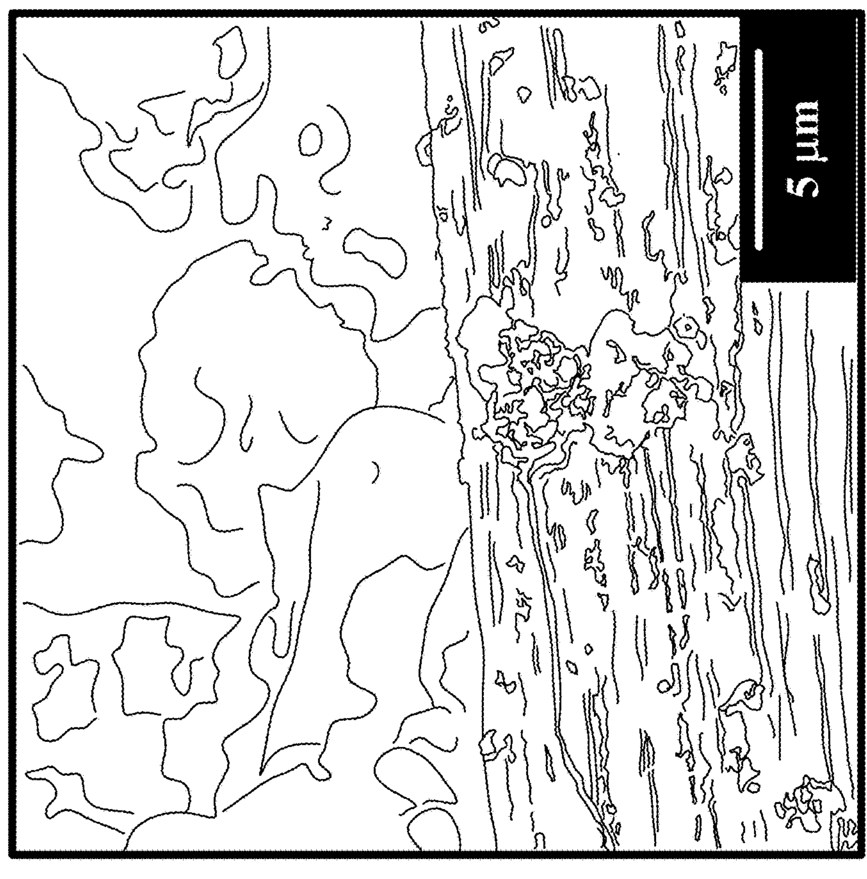
FIG. 5B shows representative SEM images of carbon fibers of the electrodes from unhealthy soils.
Figure 5A:
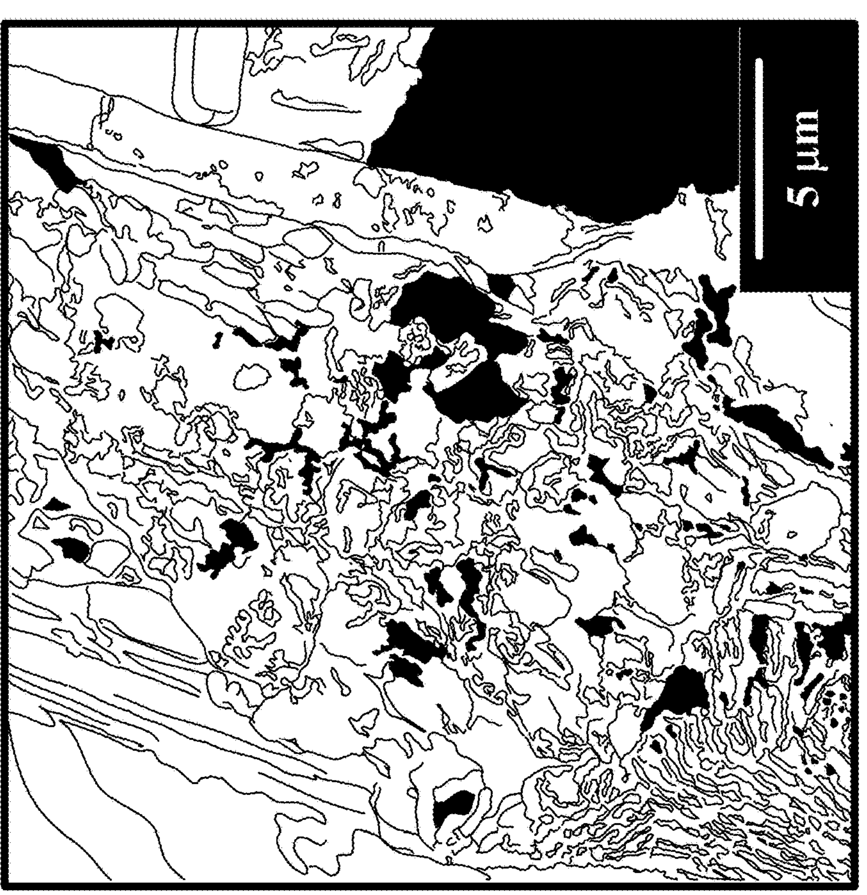
FIG. 5A shows representative SEM images of carbon fibers of the electrodes from healthy soils.

For teaching purposes, FIGS. 5A and FIG. 5B show graphical representations of real images of carbon fibers of the carbon cloth electrodes utilized herein harvested after polarization in healthy and unhealthy soils., respectively. In general, the presence of microbes was observed on the carbon fiber after polarization in healthy soil. Healthy soils provide a suitable environment to support the metabolism and replication of soil microbes. It is submitted that the electrochemical behavior observed in healthy soil is due to the enrichment of EABs, where electrons generated through microbial metabolism could be transferred to the polarized electrode via extracellular electron transfer. Electrochemical data alone do not definitively show whether the observed electrochemical signals are a result of the enrichment of EABs or of specific redox reactions. Scanning electron microscopy (SEM) images provided secondary evidence to support the enrichment of EABs on the surface of polarized electrodes deployed in healthy soil reactors.

The graphical representations of the images of polarized electrodes in healthy soil reactors (see FIG. 5A) demonstrated the attachment of microbial populations around the carbon fiber strands. On the other hand, images of the electrodes from unhealthy soil reactors (see FIG. 5B) do not show the presence of microbial cells or attachment to the electrode surface. Put together, the electrochemical data and SEM images support that EABs could be enriched on carbon electrodes in soil systems, which is capable of being monitored through electrochemical measurements. Because anodic current was observed only in healthy soil reactors, electrochemical signals can be used as an indicator for soil health.

Response to the Addition of Glucose is Observed in Both Healthy and Unhealthy Soil Reactors The selective observation of electrochemical signal microbial colonization of electrode surface in the healthy soil reactors is attributed to the soil's ability to support microbial metabolism and cell replication. As a confirmation, a soil amendment was tested to determine whether it could stimulate the electrochemical signals in unhealthy soil reactors. A solution of glucose, of which act as a carbon source and electron donor, was added to both healthy and unhealthy soil reactors that were polarized at, for example, 0.3 $V_{Ag/AgCl}$ for 10 days. Glucose, as an electron donor, can provide two electrons (2*e*) and one molecule of oxygen (O 2), which aid in the electronic current being detected. The solution of glucose (also a root exudate) as previously stated above, can act as a carbon source, it is also to be noted that other carbon sources that in soils such as, but not limited to, malic acid (a root exudate) so as to also operate as fuel for microbial metabolisms. As provided herein, under high N, plants secrete more carbohydrates such as glucose, while under low N, they secrete more organic acids such as malic acid.

Figures 6A, 6B:
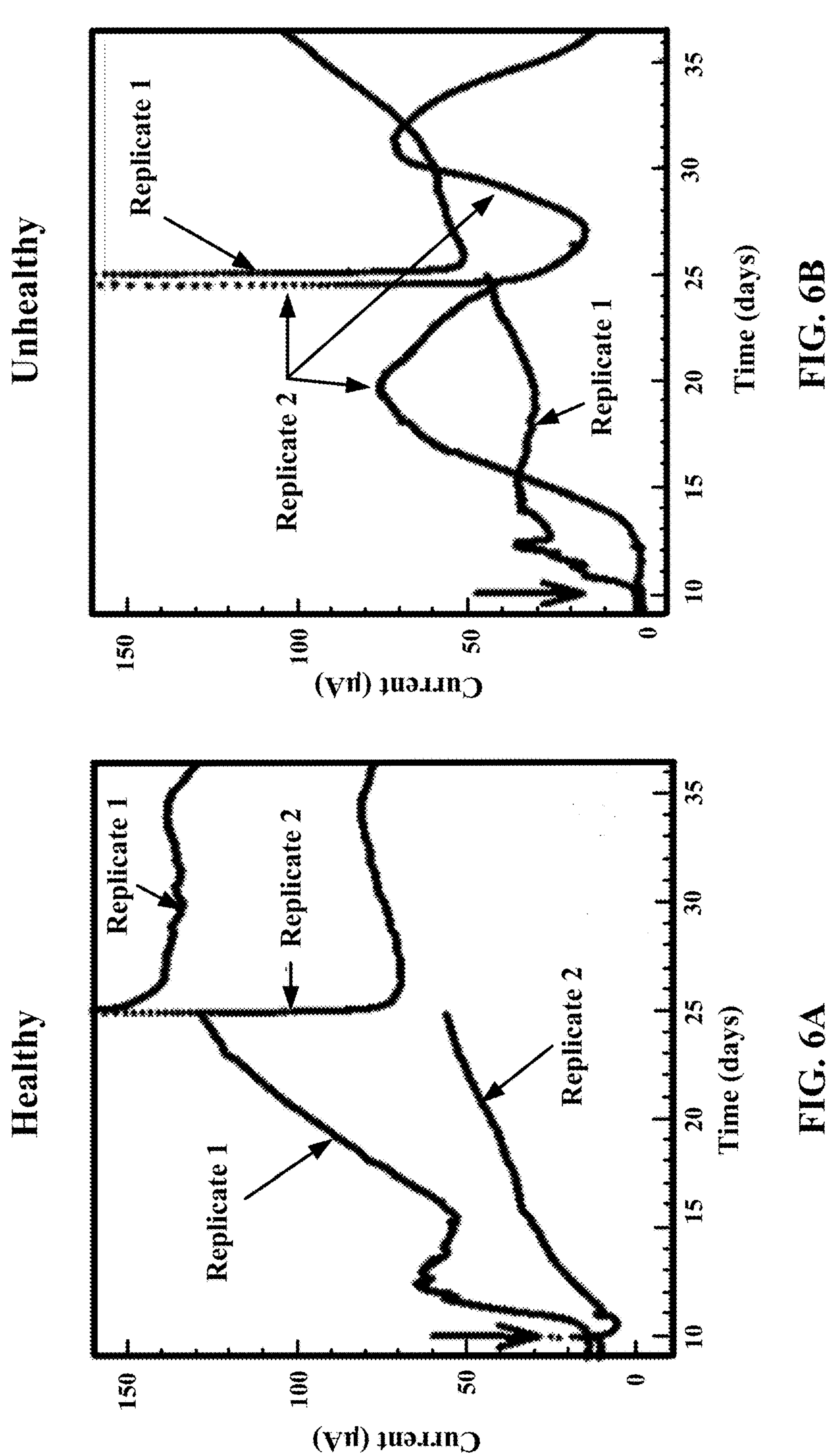
FIG. 6A shows the response of polarized electrodes deployed in healthy soil reactors to the addition of glucose.
FIG. 6B shows the response of polarized electrodes deployed in unhealthy soil reactors induced by the addition of glucose.
Figures 7A, 7B, 7C, 7D:
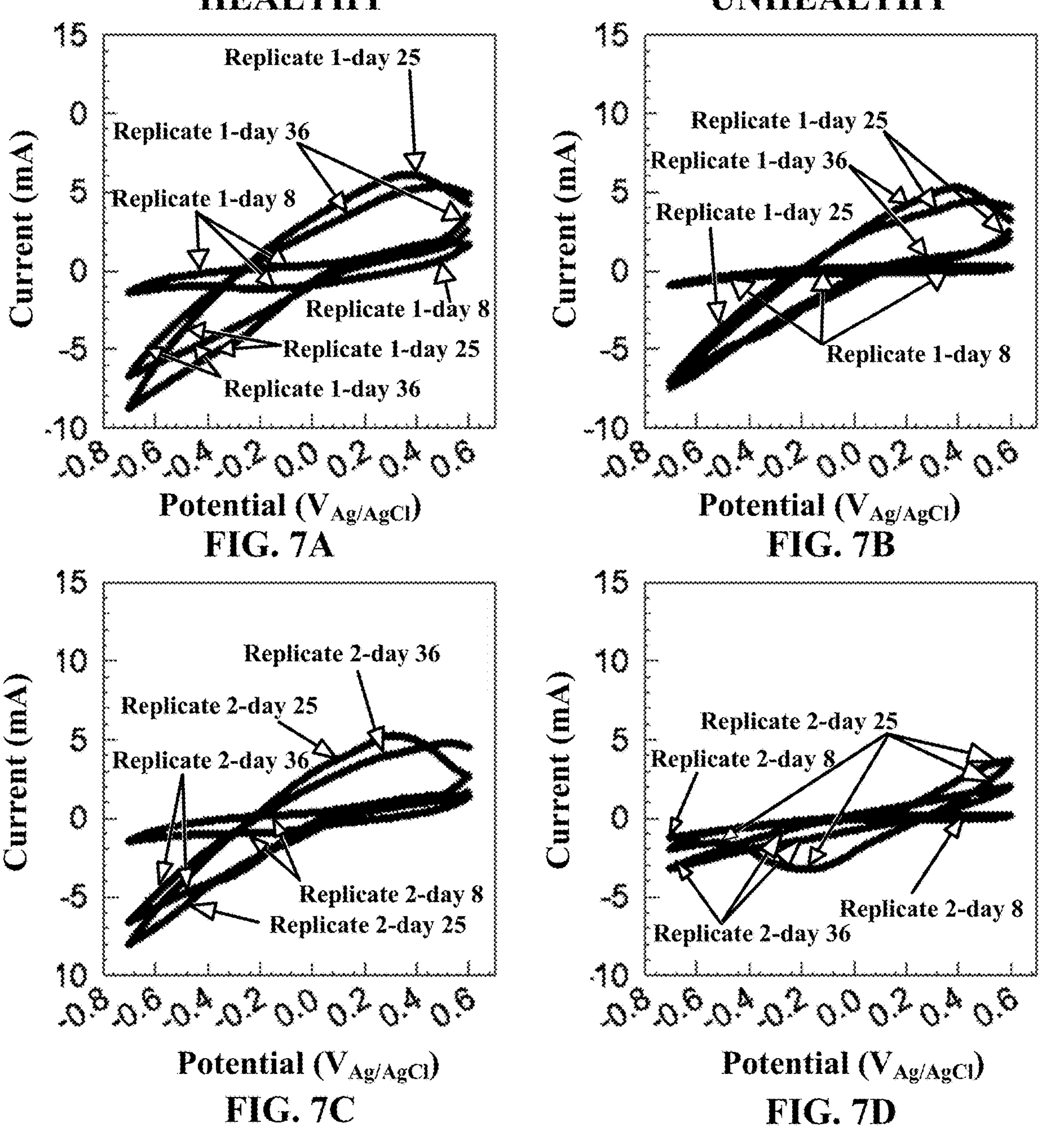
FIG. 7A shows the cyclic voltammograms for electrodes deployed in healthy soil reactors.
FIG. 7B shows the cyclic voltammograms for electrodes deployed in unhealthy soil reactors.
FIG. 7C also shows the cyclic voltammograms for electrodes deployed in healthy soil reactors.
FIG. 7D also shows the cyclic voltammograms for electrodes deployed in unhealthy soil reactors.

FIG. 6A and FIG. 6B show current responses of healthy and unhealthy soils respectively following the amendment of soil reactors with glucose (time indicated with arrows). Although healthy (see FIG. 6A) and unhealthy (see FIG. 6B) reactors started at a different baseline (13.8 μA (replicate 1) and 10.7 μA (replicate 2) for healthy soil compared to 0.4 μA (replicate 1) and –0.9 μA (replicate 2) for unhealthy soil), anodic current increased above baseline within 3 days after the addition of glucose. Healthy soil reactors reached a maximum of 138.2 μA and 81.2 μA, significantly higher than the maximum current observed prior to glucose addition. This indicated that the enrichment of EABs may be limited by the nutrient availability, even in healthy soil systems. Unhealthy soil reactors showed an increase in anodic current in both unhealthy soil replicates following glucose addition. However, both replicates showed a different temporal response. Replicate 1 showed an increase within the first day following glucose addition and reached a relatively steady response averaged at 32.6 μA between 4 and 11 days after glucose addition. Afterward, the anodic current continued increasing and reached 110.1 μA at the end of the measurements.

FIGS. 7A-7D show cyclic voltammograms for electrodes deployed in healthy (FIG. 7A and FIG. 7C) and unhealthy (FIG. 7B and FIG. 7D) soil reactors. Cyclic voltammograms were recorded immediately after constant polarization for 8 days (day 8), and after the addition of glucose to soil and constant polarization for 17 and 28 days (day 25 and 36).

In particular, cyclic voltammetry was used to compare the electrochemical behavior on the electrodes before and after glucose amendment. CVs were recorded 15 and 26 days after glucose amendment (day 25 and day 36 of the experiment). In both healthy and unhealthy soils, CVs recorded after glucose amendment showed a higher anodic current magnitude in comparison to CVs of enriched EABs prior to glucose amendment. In both replicates in healthy soil reactors, CVs recorded after 15 days of glucose amendment showed anodic region above –0.1 $V_{Ag/AgCl}$, with an anodic peak centered at 0.3-0.35 $V_{Ag/AgCl}$ CVs recorded at days 36 show a similar anodic region with a comparable current magnitude while the anodic peak shifted to –0.5 $V_{Ag/AgCl}$. Similar to the chronoamperometric data shown in FIG. 6B, the two replicates in unhealthy soil reactors showed a diverging response to glucose amendment. Replicate 1 showed a similar response to the healthy soil replicates, with an anodic region above –0.1 $V_{Ag/AgCl}$ in CVs recorded at day 25 and day 36. Similarly, the anodic peak shifted from 0.4 $V_{Ag/AgCl}$ at day 25 to 0.48 $V_{Ag/AgCl}$ at day 36. On the other hand, CV recorded at day 25 for replicate 2 showed an anodic region 0.2 $V_{Ag/AgCl}$ which continued to increase with increasing applied potential; no anodic peak or mass-transport limited current region were observed. Interestingly, a defined cathodic region is observed below –0.2 $V_{Ag/AgCl}$ for replicate 2 at day 25, with a defined cathodic peak centered at –0.17 $V_{Ag/AgCl}$ Repeating CV recording at day 36 showed less defined anodic and cathodic regions, which is consistent with the current decrease from 46.7 μA to 11.9 μA observed in chronoamperometry data between days 25 and 36. Overall, the electrochemical data shows that these signals can be connected to the microbial metabolism of EAB attached to electrodes and that amending soils with carbon can lead previously distinct electrochemical patterns to converge to very similar patterns.

Therefore, while a redox gradient was observed in both soil types (healthy and unhealthy), the healthy soil showed deeper reducing conditions than an unhealthy one. When electrodes were polarized anodically, distinct differences between healthy and unhealthy soils were found and scanning electron microscopy (SEM) images showed the presence of microbes strongly attached to electrodes in the healthy soil but not in the unhealthy soil. Glucose addition stimulated current in both types of soil and also caused previous differences in cyclic voltammograms (CVs) between the two types of soil to converge. Accordingly, electrical current measurements in soil can be used to assess healthy from unhealthy soil types.

Soil Health Index (SHI)

It is also to be appreciated that the sensors herein are designed to generate/compute a universal number (i.e., a quality criterion) as a metric for soil health having, for example, a reference point. It is reasonable to accept as an example that zero current value indicates the lowest measured soil activity. Thus, soil health in this context means that most plants will not grow in this soil and soil with no nutrients will not support appreciable microbial growth (unhealthy soil). However, is also to be noted that the example reference point (e.g., zero current) could change depending on various conditions, which then results in a reflective generated index indicative of soil health. The following describes the Indexes (SHI) generated by the embodiments herein.

Current Based Soil Health Index

For a current based SHI, Eqn. 1 is utilized.

$$SHI = \frac{\text{Current at pseudo steady state}}{\text{Current from standard soil}} \qquad \text{Eqn. 1}$$

Charge Based Soil Health Index

This is similar to the current based index. However, instead of pseudo steady-state current, the embodiments herein use charge transferred (Eqns. 2-3).

$$SHI = \frac{\text{Charge transferred for a given time}}{\text{Charge transferred for a given time for standard soil}} \qquad \text{Eqn. 2}$$

$$\text{Charge transferred} = \int_0^{final\ time} I\,dt \qquad \text{Eqn. 3}$$

where I refers to a measured current at a given time.

Complex Soil Health Index

This health index responds better in variable field conditions. We define complex soil health index as given in Eqn. 4.

$$SHI = f(\text{current, conductivity, humidity}, EIS, CV, SWV, \text{time}) \quad \text{Eqn. 4}$$

EIS refers to electrochemical impedance spectroscopy, as was briefly mentioned above. EIS data can include charge transfer resistance, diffusion limitations, etc. Conductivity refers to the electrochemical conductivity of the soil, which typically relates to the amount of ions present. CV refers to cyclic voltammograms. SWV refers to square wave voltammetry indicating activity of the electrode adsorbed redox mediators. Multiple parameters are extracted from a CV (i.e., anodic and cathodic current peaks, formal potential, onset potential). Data sets using statistical approaches (multiple regression statistical approach) to best provide the linear combination of parameters that best predict (i) long-term relative yield LTAR data and (ii) short-term plant growth data.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure and covers all changes and modifications which do not constitute departures from the true spirit and scope of this invention.

We claim:

1. A soil health monitoring method, comprising:

positioning a plurality of electrodes at below the surface of a soil at different depths and/or different locations;

measuring an open circuit potential value of each of the plurality of electrodes;

identifying an area of maximum microbial activity area in the soil based on the measured open circuit potential values and the position of each of the plurality of electrodes below the surface of the soil;

positioning a first electrode and a second electrode within the identified indicated area of maximum microbial activity; and measuring an electrochemical behavior resulting from one or more signals received from the first electrode and the second electrode to provide a health assessment of the soil.

2. The soil health monitoring method of claim 1, wherein the health assessment of the soil includes measuring a plurality of chronoamperometric values and a plurality of cyclic voltammetry values; and observing a change in the plurality of chronoamperometric values and the plurality of cyclic voltammetry values.

3. The soil health monitoring method of claim 2, wherein a change in the plurality of chronoamperometric values results from electrochemically active biofilms.

4. The soil health monitoring method of claim 2, further comprising: utilizing the plurality of cyclic voltammetry values to measure redox variations by depth to determine conditions for the enrichment of anodic electrochemically active biofilms (EABs).

5. The soil health monitoring method of claim 1, further comprising: polarizing the first electrode and the second electrode anodically to provide the health assessment of the soil.

6. The soil health monitoring method of claim 1, detecting a presence of microbes attached to at least one of the first electrode and the second electrode as an indication of healthy soil.

7. The soil health monitoring method of claim 1, wherein the health assessment of the soil further comprises: generating a Soil Health Index (SHI), wherein the SHI includes at least one of: a current based soil health index, a charge-based health index, and a complex soil health index.

8. The soil health monitoring method of claim 1, further comprising: introducing into the soil, a soil amendment solution to stimulate current to assess microbial activity.

9. The soil health monitoring method of claim 8, wherein the soil amendment solution is a carbon source.

10. The soil health monitoring method of claim 9, wherein the carbon source is selected from at least one of glucose and malic acid.

11. The soil health monitoring method of claim 1, wherein the positioning of the first electrode and the second electrode within the area of maximum microbial activity includes configuring the first electrode and the second electrode as part of a potentiostat.

12. The soil health monitoring method of claim 1, further comprising: generating 3D distributions to indicate the existence of microbial gradients and hotspots in the soil.

* * * * *